(12) United States Patent
Shen (10) Patent No.: US 7,663,509 B2
(45) Date of Patent: Feb. 16, 2010

(54) HAND-HELD ELECTRONIC EQUIPMENT

(75) Inventor: Tony Shen, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 137 days.

(21) Appl. No.: 11/373,668

(22) Filed: Mar. 10, 2006

(65) Prior Publication Data

US 2007/0159362 A1 Jul. 12, 2007

Related U.S. Application Data (60) Provisional application No. 60/753,978, filed on Dec. 23, 2005.

(51) Int. Cl.
*H03M 11/00* (2006.01)

(52) U.S. Cl. .................. 341/20; 341/22; 345/168; 345/173; 379/433.06; 379/433.07

(58) Field of Classification Search .......... 341/20, 341/22; 345/168, 173; 379/433.06, 433.07
See application file for complete search history.

(56) References Cited

U.S. PATENT DOCUMENTS

| | | | | |
|---|---|---|---|---|
| 5,677,949 A | * | 10/1997 | Macor | 379/354 |
| 5,739,744 A | * | 4/1998 | Roca et al. | 341/20 |
| 5,758,267 A | * | 5/1998 | Pinder et al. | 455/90.2 |
| 6,052,070 A | * | 4/2000 | Kivela et al. | 341/22 |
| 6,373,501 B1 | * | 4/2002 | Fiero | 715/700 |
| 6,744,427 B2 | * | 6/2004 | Maglio et al. | 345/184 |
| 7,098,896 B2 | * | 8/2006 | Kushler et al. | 345/168 |
| 7,098,897 B2 | * | 8/2006 | Vakil et al. | 345/173 |
| 7,159,194 B2 | * | 1/2007 | Wong et al. | 715/863 |
| 7,218,249 B2 | * | 5/2007 | Chadha | 341/23 |

FOREIGN PATENT DOCUMENTS

| | | |
|---|---|---|
| DE | 103 57 774 | 7/2005 |
| EP | 1 531 388 A2 | 10/2004 |
| GB | 2 321 694 A | 8/1998 |
| WO | 93/14589 | 7/1993 |
| WO | 01/84722 | 11/2001 |

OTHER PUBLICATIONS

International Search Report for corresponding Application No. PCT/EP2006/011259 mailed Jan. 26, 2007.

* cited by examiner

*Primary Examiner*—Albert K Wong
(74) *Attorney, Agent, or Firm*—Renner, Otto, Boisselle & Sklar, LLP

(57) ABSTRACT

A hand-held electronic equipment adapted to receive data input is disclosed, comprising an oblong main body, a display arranged on said main body, said display being adapted to display a keyboard with a plurality of symbols, and a selecting device arranged on said main body, said selecting device enabling a user to select and input a symbol from said keyboard.

20 Claims, 5 Drawing Sheets

HAND-HELD ELECTRONIC EQUIPMENT

CROSS REFERENCE TO RELATED APPLICATION

This application claims priority under 35 U.S.C. §119 to U.S. Provisional Application No. 60/753,978, filed Dec. 23, 2005, the entire disclosure of which is incorporated herein by reference.

TECHNICAL FIELD OF THE INVENTION

The invention relates to a hand-held electronic equipment adapted to receive data input.

DESCRIPTION OF RELATED ART

Mobile handheld equipments like PDAs, mobile phones, smart phones, tablet PCs, and GPS navigators are becoming more and more popular and technically advanced. It is, for expamle, possible to surf the internet on a TV set or to download a menu to a refrigerator. Therefore, people need powerful and ultra portable devices as their user interface to their digital life equipment.

A handheld equipment for data input is known in prior art from EP 1 531 388 A2, the device comprising a body adapted to be held by a user and a handle attached to and moveable in relation to the body for the selection of symbols by a user. The handle is moveable along the longitudinal axis of the hand-held equipment and is rotatable around the longitudinal axis for scrolling through selectable symbols and for selecting a symbol. The body of the device can moreover be fixed to an electronic equipment, e.g., a stereo system, a computer, a PDA or the like, thereby serving as an input means for the electronic equipment. A user inputs or selects data, information, or text by moving the handle and scroll through selectable symbols, to scroll through a menu, names, phone numbers or the like, which are displayed on a display of the device.

From GB 2 321 694 A, a mobile telephone is known including a protruding part, which is rotatable and longitudinally moveable within a pencil style housing. The degree of rotation of the protruding part sensed by a variable resistor determines input data, e.g. a numeral. By repeating the process of selecting different numerals by rotating the protruding part, a telephone number can be inputted and dialled by the mobile telephone.

Further, from WO 93/14589, a portable electronic equipment like a radiotelephone for use in a cellular radiotelephone system is known. The radiotelephone is of pen-shape and includes a display, an earpiece, a microphone, and a moveable element. The movable element can rotate around and slide in a first and second direction along a longitudinal axis extending through the device. The motion of the moveable element is used to enter data to be used by the radiotelephone. Moreover, the rotation of the moveable element causes a menu to scroll, thus displaying the menu items on a display section.

The use of these devices to input data is time-consuming and complicated and, moreover, is restricted to certain items presented, e.g., on a menu.

Because mobile hand-held devices known from prior art do not have a "QWERTY" or universal keyboard, their functionalities are limited. For example, most PDAs like Pocket PC, Palm or Smart phones use touch screen keyboards or soft keyboards, which are not convenient and use a lot of screen space. Moreover, with respect to home media controllers, e.g., TV remote controls, it is not possible to move the cursor or input characters directly. On the other hand, mini- or foldable keyboards, a portable mouse and stylus etc. to use in combination with the above-mentioned devices, are either too big in size or too small for comfortable usage and they only have a unique function for each device, and, therefore, for a tablet/pocket PC, e.g., a keyboard, a mouse and a stylus are needed, thus, degrading the convenience of portability.

In view of the aforementioned shortcomings associated with conventional hand-held electronic equipment, there is a strong need in the art for a hand-held electronic equipment for data input, having various functionalities, while having the smallest possible and most compact format to provide for optimal portability.

SUMMARY

The hand-held electronic equipment of the present invention comprises an oblong main body and a keyboard arranged on said body, said keyboard comprising a plurality of keys with symbols enabling a user to input a symbol to the equipment by selecting one of the plurality of keys. The provision of the keyboard on the main body of the electronic equipment according to the present invention enables a simple but effective input of data in an advantageous manner while the equipment can have a small, portable and hand-held size. In contrary to prior art equipments, which only display one or two rows in a small display area on that surface or which have only a few selected input keys, the hand-held equipment of the present invention by providing an entire keyboard enables a quick and versatile input of data. By using the major part of the outer surface of the main body of the equipment for the provision of the keyboard, the overall size of the hand-held equipment can be chosen to be very small and ultra-portable.

It is to be noted that the term 'data' in the context of the present application includes all kinds of data and information, such as letters, characters, numbers, symbols and so forth, as well as all kinds of instructions, control operations and the like, which can be input by a user via a keyboard in corporation with a selecting device and/or any other additional input devices. The term "symbol" in the context of the present application is used to characterise any kind of visual presentation of information or data, including characters, letters, numbers, instructions, functions and so forth.

Advantageously, the keyboard is a mechanical keyboard with keys that are adapted to be pressed by a user in order to input a selected symbol. Alternatively, the keyboard is displayed on a display arranged on said main body. Hereby, the display may be a touch screen and the keys are embodied as soft keys. In the above-mentioned case in which the keyboard is displayed on a display arranged on said main body, the hand-held electronic equipment may advantageously further comprise an input device enabling a user to scroll through said keys of said keyboard and to select a key to input a symbol. Hereby, the respectively selectable symbol is advantageously highlighted on said keyboard, so that the user knows which of the symbols can actually be chosen. The highlighting can be realised in various manners, e.g. by increasing the size of the respective symbol in relation to the other symbols, by illuminating the respective symbol or by any other way of indicating the respectively selectable symbol to a user.

Further advantageously, the hand-held electronic equipment of the present invention further comprises a scroll device that is rotatable around and movable back and forth along a longitudinal axis of the hand-held electronic equipment in order to enable a user to scroll through data. Hereby, in case that the keyboard is displayed on a display, the scroll device may be the above mentioned input device, which can be used by a user to scroll through the symbols of the keyboard and to select a respective symbol. Hereby, by rotating the scroll device in a circumferential direction around the main body of the electronic equipment, one symbol after another within a column of the keyboard can be selected, and by moving the scroll device back and forth along the longitudinal axis, one symbol after another in a respective line of the keyboard can be chosen. Then, when the respectively wanted symbol is reached, the user can input the wanted symbol by activating a respective selecting device. The selecting device can be any kind of switch, push button or the like arranged on the electronic equipment.

Further advantageously, the hand-held electronic equipment may comprise a switch for switching between several functions of the equipment. E.g., in case that the keyboard is displayed on a display, the switch can be used to switch between different kinds of keyboards. Further, additional functions like a joystick function, a mouse function and so forth can be switched on and off or can be varied by using the mentioned switch.

Advantageously, the hand-held electronic equipment of the present invention is a data input device comprising an interface which is adapted for a wireless and/or wired connection to a host machine in order to transmit data via the keyboard to such a host machine. For example, the electronic equipment of the present invention can be connected via a cable, such as for example a USB or any suitable wired connection, with a host machine in order to input data to the host machine. Alternatively or additionally, the electronic equipment of the present invention may establish a short-range or mid-range wireless connection with a host machine, such as for example via an infrared, a Bluetooth or any other suitable wireless link, in order to input data to the host machine in a wireless manner. Hereby, space can be saved on the host machines, which do not need a keyboard or any other kind of input devices, since the electronic equipment of the present invention provides an ultra portable, lightweight still efficient and simple way of inputting data to such a host machine. It is to be noted that in case of the wired connection, the electronic equipment could be charged by the host machine via the wired link or vice versa.

It has to be noted that the term 'host machine' as used in the present application comprises all kinds of electronic equipments which can receive data, instructions, functions, control operations etc. from a hand-held electronic equipment according to the present invention, including but not limited to mobile telephones, pagers, communicators, PDAs, electronic organisers, laptops, PCs, servers, TV sets, radios, portable or non-portable multimedia recorders and/or players, pocket PCs, smart phones, gaming devices, palms, etc.

Advantageously, in addition or as alternative to the above-described features and functionalities, the hand-held electronic equipment of the present invention can be a radio communication device comprising an interface which is adapted for a wireless communication in wireless communication system. Thus, in addition to the input possibilities described above, the electronic equipment could function as a mobile telephone or the like for a communication in a wireless communication system, such as a wireless cellular telecommunication system.

Advantageously, the electronic equipment is multifunctional and comprises one or more of the following functionalities: pen function, such as a ballpen function, stylus function, keyboard input function, mouse function, joystick function, such as multi-direction joystick function, LCD screen (enabling the equipment to be used independently), digital audio player, earphone socket, hands-free (speaker and microphone), camera function, text scanner function, voice recorder function, mini track ball function, multimedia recorder and/or player function for digital audio, image and/or video, GPS function (equipment may integrate GPS antenna and receiver) and so forth, rendering the electronic equipment even more useful and versatile and practical. Additionally, for example a laser beam pointer could be integrated into the electronic equipment.

It is also preferred that a function of the hand-held electronic equipment can be selected and is defined by the position of the hand-held electronic equipment which is detected by an integrated orientation sensor. Advantageously, there are four defined positions corresponding to respective functions, whereby the positions correspond to a rotation of the hand-held electronic equipment of 90 degrees, 180 degrees, 270 degrees and 0 degrees. Thus, the hand-held electronic equipment's function or usage, respectively, is defined by its position detected by the integrated orientation sensor. For example, when the equipment is used horizontally, i.e. around 0 degree, it is in keyboard mode. When the equipment is used vertically, i.e. around 90 degrees, with the pen tip or first tip, respectively, down and the joystick tip or second tip, respectively, up, it is in a mouse/jog dial mode. When the equipment is used horizontally again, but turned around 180 degrees, it is in a media control mode, and finally, when the equipment is used vertically again, but turned around 270 degrees with the joystick tip or second tip down and the pen tip or first tip up, it is in an applications/contents switcher mode. To enable that the hand-held electronic equipment can distinguish between a change of the pen's position in order to switch to another mode or if it is just a movement intended to turn the pen around to the backside (i.e., the position of 180° can also be reached when the hand-held electronic equipment is just turned around by a user who wants to use the backside), the movement of the hand-held electronic equipment is traced and used to give a command to the pen or to define its function or usage. For example, moving from the position of 0° to 90° to 180°, the hand-held electronic equipment will know that the user wants to use it as a media player. Otherwise, if the position is directly switched to 180° (i.e. a longitudinal rotation), then the hand-held electronic equipment will know that the user wants to use the keys provided on the backside of the hand-held electronic equipment.

Moreover, since an integrated chip (IC) can trace and record the hand-held electronic equipment's movement by means of the orientation sensor or direction/inclinometer, it is possible to use the hand-held electronic equipment as a handwriting/drawing digitalizer.

Preferably, the hand-held electronic equipment has a mouse mode, whereby the mouse function can be enhanced by "camera mouse" (optical mouse technology by integrated digital camera). Further, the hand-held electronic equipment has a keyboard mode, whereby the keys which are not used so frequently or control keys are provided on the backside of the hand-held electronic equipment, so the user can avoid turning the equipment around for many times. The control keys are big enough and positioned logically so the user can easily remember their positions. Arrow keys are provided in the middle part.

Moreover, according to a preferred embodiment, the hand-held electronic equipment has an applications/contents switcher mode. In this mode the user can use the joystick and scroll to switch between applications and contents, e.g., for Windows XP, the user can switch between Word, Excel, Internet Explorer, etc. Moreover, the user can switch the contents also in the pages of, e.g., Excel or Word. A typical usage could be that the user rotates the scroll ring/strip clockwise or counter-clockwise to switch the applications, push or pull the scrollring/strip to switch contents, click the second tip (joystick) to switch minimisation or to restore any application window.

The hand-held electronic equipment is preferably adapted to be configured by a user for either left or right hand usage, key definition, double click speed adjustment, and strength sensitive cursor moving speed. The user can configure the hand-held electronic equipment in the terminal side drive/software. Moreover, the user can redefine or re-associate the functions or usages, respectively, with respect to the hand-held electronic equipment's positions at 0, 90, 180 and 270 degrees. Further, the user can configure the hand-held electronic equipment such that a time delay for switching the functions is provided and the user does not have to be nervous that the pen's reactions are too sensitive. For example, the hand-held electronic equipment could be configured such that, e.g., after it is rotated for 270° for 700 ms, it will switch to another mode, but not before this time period lapses. Any other predetermined time period can also be employed.

According to another preferred embodiment, the hand-held electronic equipment comprises further functionalities of a text scanner, in particular a C-pen. By means of a patterned graph, the text scanner can be used as an optical mouse, like a C-mouse. Further useful integrated functions of the hand-held electronic equipment are a digital camera and a voice recorder. The media files can be sent to the hosted terminal machines for further processing, when the hand-held electronic equipment is connected thereto. If a digital camera is integrated with the hand-held electronic equipment, technologies like "camera mouse" and "scene text capture" can be applied to the equipment for cursor control and text scan/capture in life/on paper. The joystick function can be enhanced by a strength sensitive multidirectional joystick, wherein the cursor moving speed can be adjusted by applying different pressing strength on the joystick.

It is advantageous that the hand-held electronic equipment comprises a mini track ball, being a design variant for persons who prefer a track ball rather than a joystick.

Preferably, the hand-held electronic equipment comprises a refined orientation sensor, whereby the sensor is refined to a direction inclinometer such that it does not only sense the pen status of horizontal and vertical, but also senses an angle or gradient of the equipment. There are at least two possible methods to control a cursor by means of a direction inclinometer: The user controls the cursor's speed or direction or acceleration by pointing the equipment in a certain direction and incline it at an angle. For example, if it is desired that the cursor goes to an upper left corner of the screen, the hand-held electronic equipment has to be put in a position corresponding to a clock position of 10:30. The moving speed of the cursor and acceleration is determined by how much and how quick the user inclines the hand-held electronic equipment. Using the above-described method, when the user holds the hand-held electronic equipment vertically around 90 degrees, the cursor is supposed to stop. The other method, which can be employed is the direct position association, wherein the hand-held electronic equipment's position directly determines the cursor's position (for a screen of 1280×1024 resolution, there is a total of 1310720 positions). This mode enables quick and accurate cursor positioning, whereby the user controls the cursor in an intuitive way as he points it to the screen directly. Also an advanced cursor action like "drag to select" and "drag and drop" can be easily achieved by this mode. Here, when the user holds the equipment vertically around 90 degrees, the cursor is supposed to immediately return to the center of the screen (for a 1280×1024 screen, the coordinates are 640, 512).

Finally, in still another preferred embodiment, the hand-held electronic equipment comprises an infrared or LED transceiver so that it can be used as a normal optical mouse without a patterned graph.

The hand-held electronic equipment, however, can still be provided with many more functions, like, e.g., LED indicators can be provided to indicate a user in which mode the equipment is functioning, or there can be provided a beep function to indicate a user that the mode has been changed. The icon representing the equipment on the host machine shall then also be changed according to the different states, mode, functions etc.

Advantageously, the equipment is adapted to be connected to a wireless or wired remote controller, in which a screen can be integrated to display data, and a socket adapted to plug in a hands-free device.

It shall be emphasised that the term "comprise/comprising" when used in this specification is taken to specify the presence of stated features, integers, steps or components but does not preclude the presence or addition of one or more other features, integers, steps, components or groups thereof.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be described in detail in the following with reference to the drawings in which.

DETAILED DESCRIPTION OF EMBODIMENTS

Figure 1:
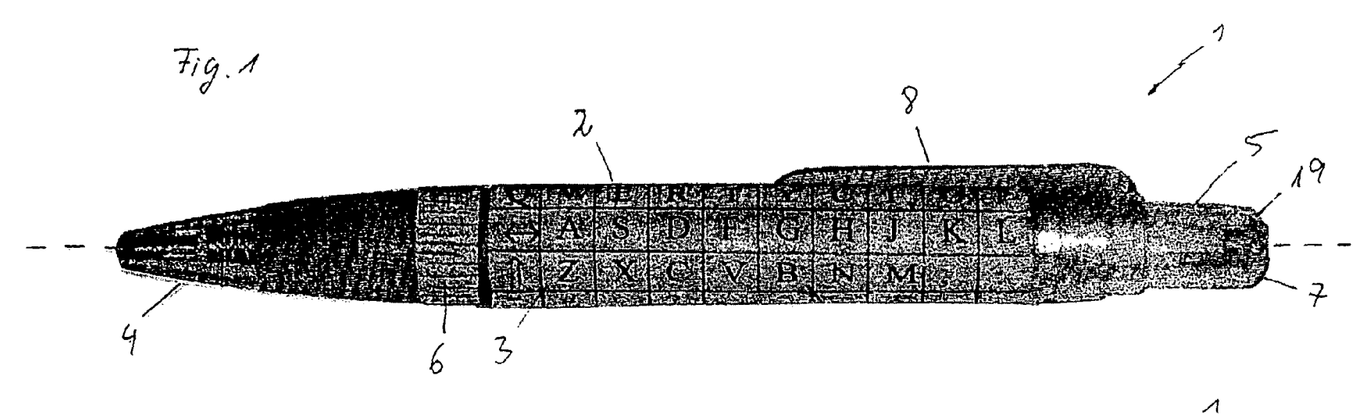
FIG. 1 shows a front view of an embodiment of the hand-held electronic equipment according to the invention.

FIG. 1 shows an embodiment of the hand-held electronic equipment 1 according to the present invention. The hand-held electronic equipment 1 has a ball pen-like design. The hand-held electronic equipment 1 has a cylindrical main body 2 on which a full keyboard 3, e.g. a full layout QWERTY, QWERTZ, universal keyboard or the like, is provided. The keyboard 3 comprises the plurality of keys which symbols enabling the user to input a symbol to the equipment by selecting one of the plurality of keys. Hereby, the keyboard 3 may be a mechanical keyboard with keys which can be depressed by a user in order to input a wanted symbol. Alternatively, the keys can be realised as touch pads or any other kind of sensing means adapted to detect the force exerted by the finger of a user and/or the touch of the fingertip of a user. Alternatively, the keyboard may be displayed on a display arranged on said main body. Hereby, the display may be a touch screen and the keys can be realised as softkeys. On one end of the main body 2, a first tip 4 is provided, and on the other end, a second tip 5 is provided. The first tip 4 can either function as a pen for writing or as a stylus. Between the main body 2 and the first tip 4, there is further provided a scroll ring 6. The scroll ring 6 may have different functionalities depending on the embodiment of the hand-held electronic equipment 1 of the present invention. Generally, the scroll ring 6 is rotatable around the main body 2, i.e. around the longitudinal axis A of the electronic equipment 1 and movable back and forth along the longitudinal axis A and enables a user to scroll through data. Hereby, in case that the keyboard is displayed on a display of the main body, the scroll ring 6 may e.g. be used by a user to scroll through the symbols of the keyboard in a circumferential direction and in the longitudinal direction as mentioned. The respectively selectable symbol can then be highlighted so that the user can see which one of the symbols of the keyboard can be selected. Then, the respectively wanted symbol can be selected by pressing a corresponding selecting switch. E.g, the second tip 5 can be configured as such a selection switch or push-button enabling the user to select on input a respectively chosen symbol from the keyboard. The selection switch 19 can also function as "ALT" etc. when being pushed down to switch the keys or the scroll ring 6 to a user-defined or pre-defined alternative or customised function. It is to be noted that the scroll ring 6 instead of being arranged between the first tip 4 and the keyboard 3, as displayed in FIG. 1 and FIG. 2, can also be arranged between the keyboard 3 and the second tip 5. In both locations, however, the scroll ring 6 is rotatable and pushable and pullable in order to input data, functions, instructions, etc. In case that the keyboard is a mechanical keyboard, the scroll ring 6 can be used for other functionalities. E.g, in case that the hand-held electronic equipment is an input device through which a user can input data, functions, instructions etc. to a host machine via a wired or wireless connection, the scroll ring 6 can be used to scroll through information displayed on a display on the host machine, e.g. scroll through pages etc.

If the second tip 5 is pushed down long, the hand-held electronic equipment 1 can be switched on or off. The equipment 1 may further comprise a backlight function for the keyboard, the scroll ring and the second tip.

Figure 2:
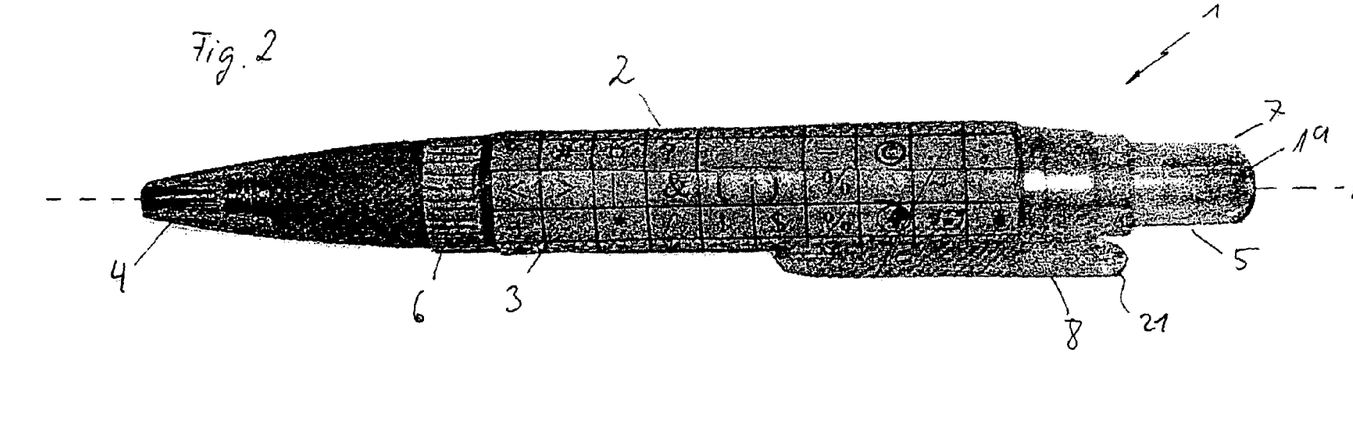
FIG. 2 shows a rear view of an embodiment of the hand-held electronic equipment according to the invention.

When the hand-held electronic equipment 1 is switched off, the user can recharge it simply by rotating the scroll ring 6, whereby a mini-electricity generator incorporated in the equipment 1 is driven, and which is a useful function in case the emergency battery is empty. The user can also gear up a handler (not shown) to the scroll ring 6 to facilitate charging the battery. Moreover, the second tip 5 can function as a multidirectional joystick 7. A clip 8 as it is also provided on regular ball pens to fasten the hand-held electronic equipment 1, e.g., in a front pocket of a jacket or something similar, is provided on the main body 2 adjacent to the second tip 5. Moreover, a mouse right click button 21 can be provided on top of the pen clip 8. As can be seen from FIG. 1, the letters on the front part of the cylindrical body 2 of the hand-held electronic equipment 1 are provided in the typical QWERTY layout. However, other layouts are also conceivable as, e.g. the QWERTZ layout for German language when the product is intended for the German market, or the AZERTY layout for French language when the hand-held electronic equipment 1 is intended to be sold in France. Moreover, the keyboard 3 can e.g. be adapted for an US-international keyboard configuration, whereby operation between the standard US layout and the US-international layout and the other possible layouts can be toggled by using a particular key, e.g. the right ALT key, provided for this purpose. The US-international layout allows a user to type virtually all of the characters used in the Western-European languages. In FIG. 2, a rear view of the hand-held electronic equipment 1 is shown, whereby the symbols provided on the keys are symbols which are not so frequently used. Thus, the user does not have to turn the hand-held electronic equipment 1 around so often. A wireless interface 23 (of FIG. 6) is provided in the hand-held electronic equipment 1 for connecting it to a host machine like a mobile phone, PDA or something similar. Via the interface 23, any data input by a user to the keyboard 3 or the other input elements is forwarded to the respective host machine. An integrated orientation sensor (not shown) is also provided inside the main body 2 of the hand-held electronic equipment 1, so that the hand-held electronic equipment 1 is able to sense whether the user uses it horizontally or vertically.

Figure 3:
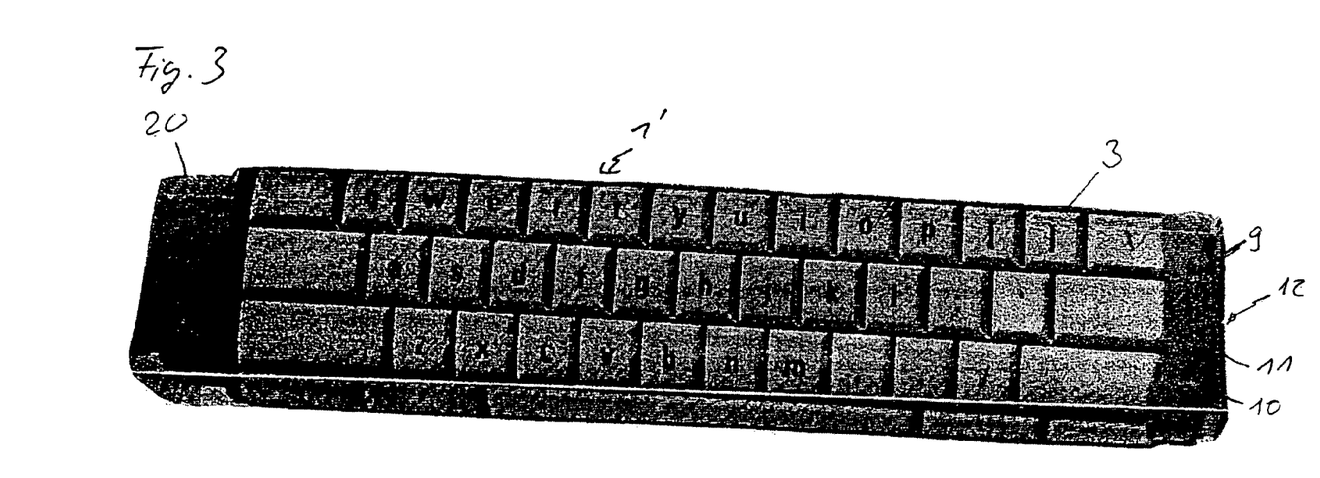
FIG. 3 shows a front view of the main cylindrical body of the hand-held electronic equipment according to the invention.
Figure 4:
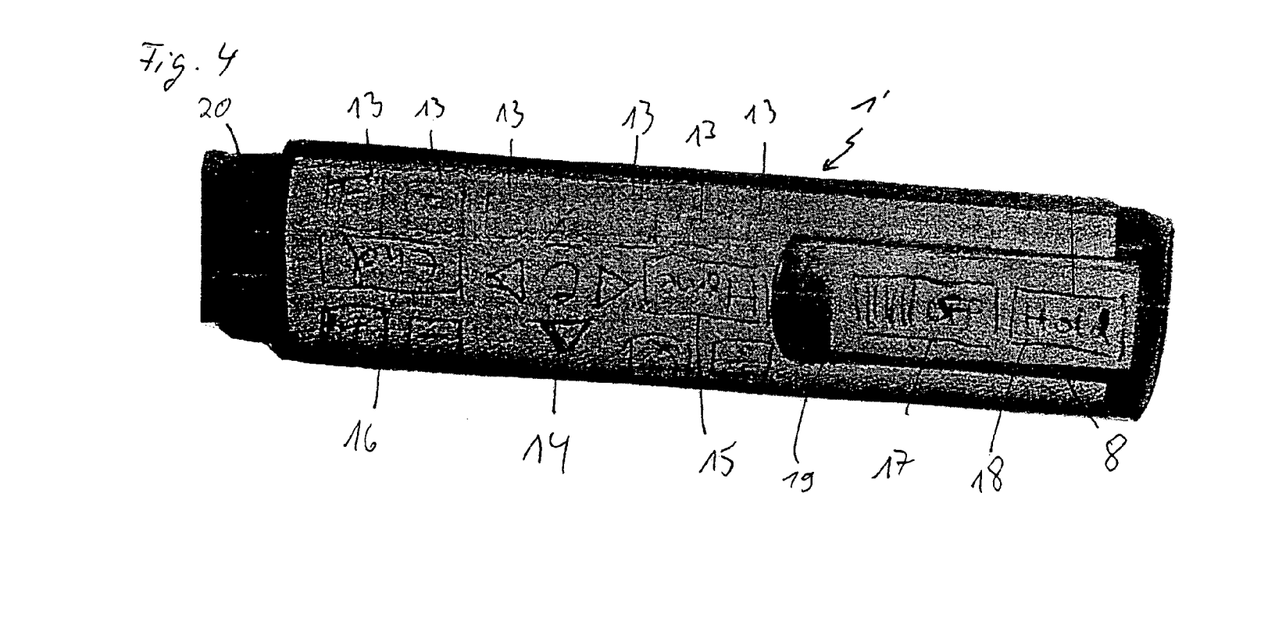
FIG. 4 shows a rear view of the main cylindrical body of the hand-held electronic equipment according to the invention.

FIG. 3 shows a different embodiment of an electronic equipment 1' of the present invention, in which the equipment has flat rectangular shape of a highlight marker pen. Here, FIG. 3 shows just the front part of the universal keyboard 3, wherein the letters are again arranged in the typical QWERTY order as an example. The keyboard 3 is provided on almost the entire outer surface of the highlight marker shaped design. As can be seen from FIG. 3, the main body 2 is of a different shape compared to the embodiment shown in FIG. 1 and FIG. 2, in that it is more of a prolate shape than cylindrical. The embodiment shown in FIG. 3 also differs from the embodiment shown in FIGS. 1 and 2 in that instead of a scroll ring 6, a scroll strip 20 is employed, which has otherwise the identical functions as the scroll ring 6. On the right side of the keyboard 3, a right key 11 of a mouse 12 and a left key 9 of the mouse 12 are provided, whereby in between is a further key 11 which can function as strength sensitive multidirectional joystick 11. However, it is just as well conceivable just to provide only one mouse key instead of the right key 11 and the left key 9, simplifying the design of the keyboard 3 and thus, rendering a simple and reliable mechanical structure. The keys 9, 10, and 11 can also be used as arrow keys instead of controlling a cursor. When they are to be used as regular keyboard arrows, moreover, pushing them down long means "home" or "end", respectively. Instead of the keys 9, 10, 11, a mini trackball (not shown) can also be provided. FIG. 4 shows the back side of the keyboard 3, on which in this embodiment control keys 13, which are not often used, are provided. The control keys 13 are provided in a logical order so that a user can easily remember their position on the cylindrical main body 2 of the hand-held electronic equipment 1'. In the middle, there are provided arrow keys 14. Moreover, on the back side of the keyboard 3, there is provided a key 15 for "home" as well as a key 16 for "end". Here, it can be also seen that the clip 8 is provided with two switches, one of which has the function of "hold" and the other one is an "on/off" switch. The keys "Shift, Control, Caps Lock, Windows, Alt" and other control keys could be located on the backside of the keyboard 3. The selecting switch 19 for selecting and inputting a symbol from the keyboard 3 can for example be integrated in the tip of the clip 8, so that a user presses the tip down in order to input a currently highlighted symbol.

Figure 5:
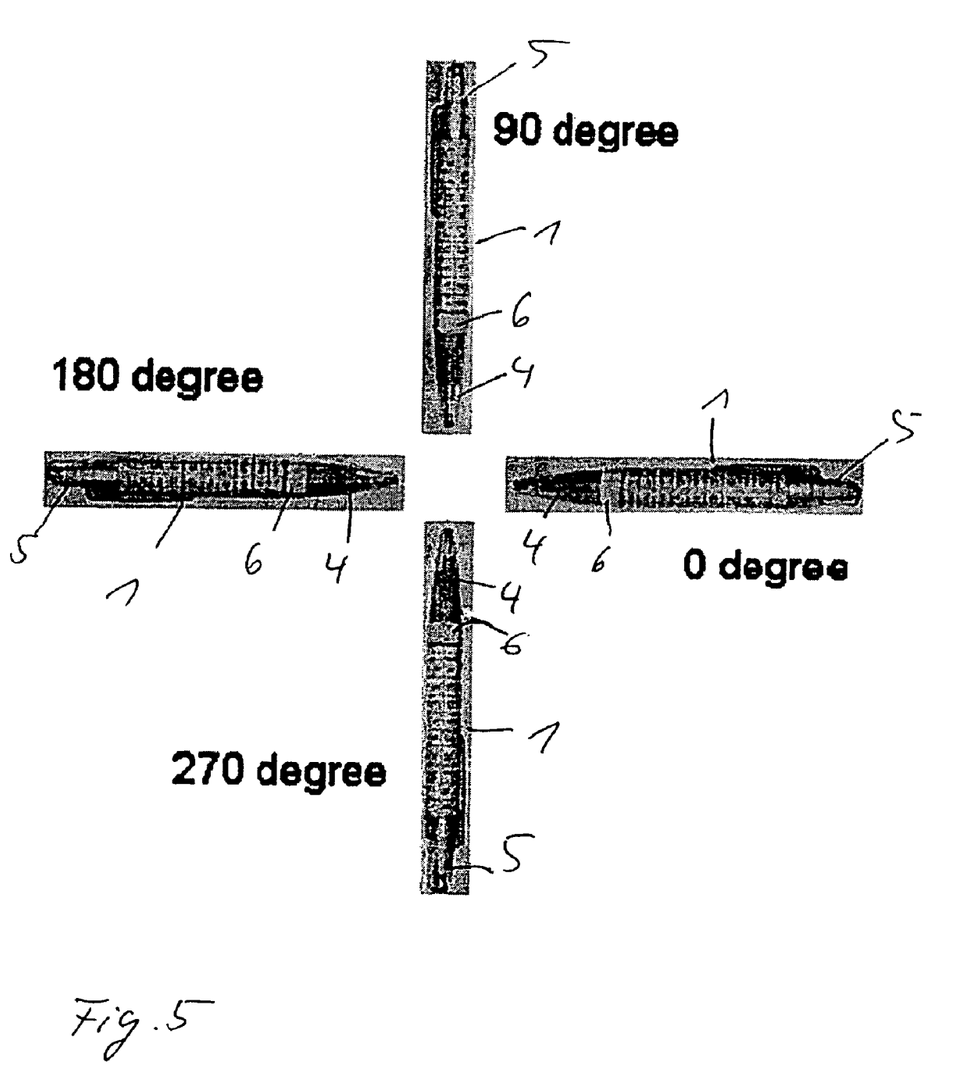
FIG. 5 shows the four positions corresponding to different functions of the hand-held electronic equipment according to the invention.

FIG. 5 shows the four positions of the hand-held electronic equipment 1, according to which the functions or different usages, respectively, of the hand-held electronic equipment 1 can be set.

As already mentioned above, the function of the hand-held electronic equipment 1 is defined by its position detected by the integrated orientation sensor. In a first position which corresponds to 0 degrees, the hand-held electronic equipment is in the keyboard mode: the joystick 11 functions as arrow keys and when the joystick 11 is pushed, this functions as carriage return. The scroll ring 6 can be rotated to move a page up or down, whereas when the scroll ring 6 is pulled or pushed, respectively, the page is moved forward or backward. At the second position of 90 degrees, when the hand-held electronic equipment 1 is used vertically, i. e., the first tip 4 points downwards and the second tip 5 points upwards, the mouse/jog dial mode is activated, wherein the multidirectional joystick 11 is used to control the screen cursor; and when it is pushed, a selection is made similar to clicking the left mouse button of a mouse. There can also be provided a mouse right click button (not shown) on the clip 8 of the hand-held electronic equipment 1. Moreover, in this mode, the scroll ring 6 can be rotated to move the page forward or backward, whereas when the scroll ring 6 is pulled or pushed, respectively, the page is moved up or down. At the third position of 180 degrees, when the hand-held electronic equipment 1 is in a horizontal position again, but with respect to the first tip 4 and the second tip 5 mirror-inverted to the first horizontal position, a media control mode is activated, according to which the joystick 11 is used to control functions like play, pause, backward, forward. The scroll ring 6 can be rotated to control volume and to switch channels. This means also that when the hand-held electronic equipment 1 is positioned in this position, a media player should be automatically launched or focused. Finally, the fourth position corresponding to 270 degrees, which again is a vertical position but mirror-inverted to the second vertical position with respect to the first tip 4 and the second tip 5, is shown in FIG. 5. In this position, the hand-held electronic equipment 1 is in applications/contents switcher mode. In this mode the user can use the joystick 11 and scroll ring 6 to switch between applications and contents. For example, for Windows XP, the user can switch between Word, Excel, Internet Explorer, etc. But the user can also switch between the contents within, e.g., Excel or Word. As already mentioned-above, the user can configure the usage of the hand-held electronic equipment 1 in the terminal side drive. Possible configurable functions include: left or right hand usage, key definition, double click speed adjustment, strength sensitive cursor moving speed etc. The user can also redefine or change the functions associated with the four different positions explained above. E.g., the user can define a specific angle (e.g. 225°), which initiates a specific function (e.g. launches Microsoft Word). Another example is, in media control mode, that the user can define to pull the scroll ring 6 as skip backward, pull and the scroll ring 6 as fast backward, while to push it as skip forward, push and hold it as fast forward etc. As also already mentioned above, instead of a regular orientation sensor, a refined orientation sensor can also be employed so that the hand-held electronic equipment not only distinguishes between horizontal and vertical, but also between all positions inbetween by measuring an inclination angle of the hand-held electronic equipment 1. It is to be noted that the above described angles are detected by the equipment 1 within a certain adjustable tolerance range, e.g. ±10°, or ±15°. According to a further aspect of the present invention, the hand-held electronic equipment 1 allows a user to choose and select a respectively wanted character, number, symbol, function etc. on the display of a host machine by freely moving the hand-held electronic equipment 1 in addition to the control functionalities provided by the scroll ring 6 or instead of them. Hereby, e.g. if the hand-held electronic equipment 1 is held by the user in a 90° position, i.e. in a position in which the equipment 1 points vertically downwards, the cursor or highlighted character, symbol etc. may return to the middle of the display of the host machine. Hereby, the equipment 1 may e.g. be suitable for games like Airfighter, in which the scroll ring 6 can be used as a weapon switcher and the joystick 11 can be used as fire. The pulling or pushing of the scroll ring 6 (or the scroll strip 20) can e.g. enable or disable a turbo-boost. Alternatively, the cursor or highlighted symbol, character, function, etc. on the keyboard 3 may be returned to the middle of the display of the host machine if the equipment 1 is held in an 180° or 0° angle, i.e. is a horizontal position. Such a use may be suitable for games like Doom or Gunfighter, in which a rotation of the scroll ring 6 or scroll strip 20 can be used as a weapon switcher and pushing the joystick 11 can be used as fire. The pushing or pulling of the scroll ring 6 or the scroll strip 20 can be used to go forward and backward. In a further alternative, the equipment 1 may be used to steer the wheel of a car or vehicle in a car racing game, i.e. holding the equipment 1 in a horizontal position and rotating it about its centre may cause input control operations similar to the steering wheel of a car. Hereby, the rotating, pushing or pulling of the scroll ring 6 or the scroll strip 20 can be used to switch gears and to brake or accelerate.

Although above described was the provision of a joystick 11 on the equipment 1 for inputting game operations, the entire equipment 1 may be used as a big or a large joystick, whereby input instructions are caused by freely moving the equipment 1 in a three-dimensional manner. The scroll ring 6 or scroll strip 20 and the second tip 5 can then be used for controlling additional game functions.

Generally, the hand-held electronic equipment of the present invention comprises three new functionalities to simplify the input operation and to achieve the maximum usage comfort in a minimum format, namely providing a keyboard on the major part of the surface of the equipment in order to reach the smallest possible format, detecting the position of the device by an integrated orientation sensor in order to modify, redefine and/or associate the keys, switches, buttons, functions, etc. of the equipment, and detecting the movement of the equipment by an integrated direction sensor or inclinometer so that the movement of the device can be used to input data, commands, functionalities and so forth to the cursor or the game played and/or displayed on the display of the host machine and to digitalise the handwriting or drawing of a user when using the hand-held equipment as a pen-like device.

Figure 6:
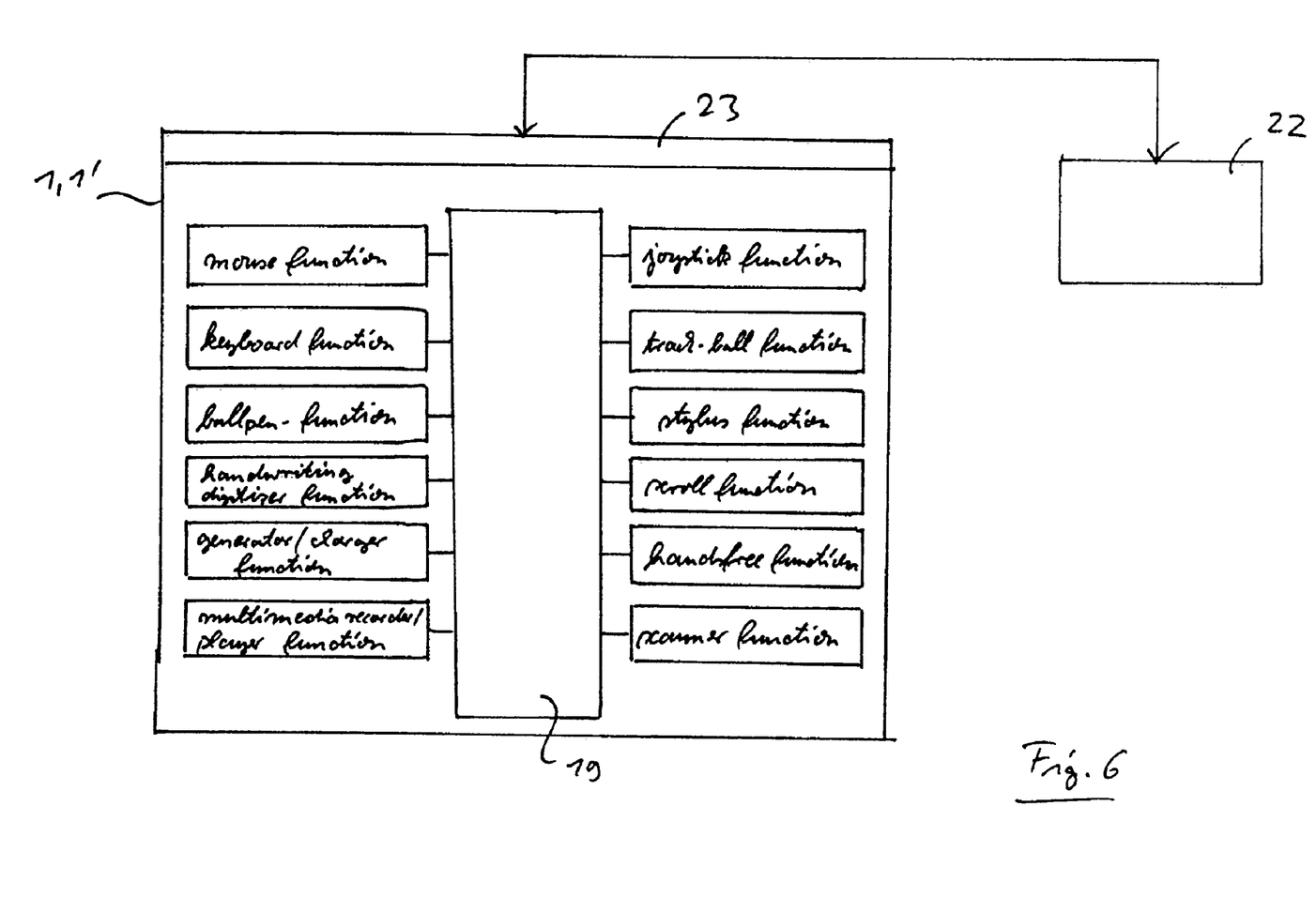
FIG. 6 shows a block diagram illustrating the functions of the electronic equipment.

FIG. 6 shows a block diagram of the hand-held electronic equipment 1 illustrating its main functions. The hand-held electronic equipment 1 is connected to a digital host machine 22 by a wire via USB. It can, however, just as well connect to a digital host machine 22 by means of a wireless connection, as already mentioned above, using, e.g. Infrared or Bluethooth technology or any other suitable wireless system. The hand-held electronic equipment 1 is connected to the digital host machine 22 over an interface 23. The internal functions of the hand-held electronic equipment 1, which can be controlled over the switch 19, are indicated, as these are: mouse function, keyboard function, scroll function, joystick function, track-ball function, stylus function, ballpen function, handwriting digitised function, generator/charger function, multimedia recorder/player function, scroll function, hands-free function and/or scanner function. The above-mentioned functions can also be used in a combined way. An example of a combined function for the scroll ring or strip is e.g. pushing and holding the ring to the right while rotating it, or pulling and holding the ring to the left while rotating it. Combined operations in this way dramatically expand the possibilities for data input without any addition of extra keys, buttons, switches or the like. The combination of functionalities can be freely defined or chosen by combining the various input elements, like keys, switches, buttons, scroll ring, scroll strip as well as the position detection of the equipment. E.g., the user can define personal combinations for a specific functionality, such as "rotate the scroll ring at a right position while the joystick is held and the equipment is at an angle of 225°".

Figure 7:
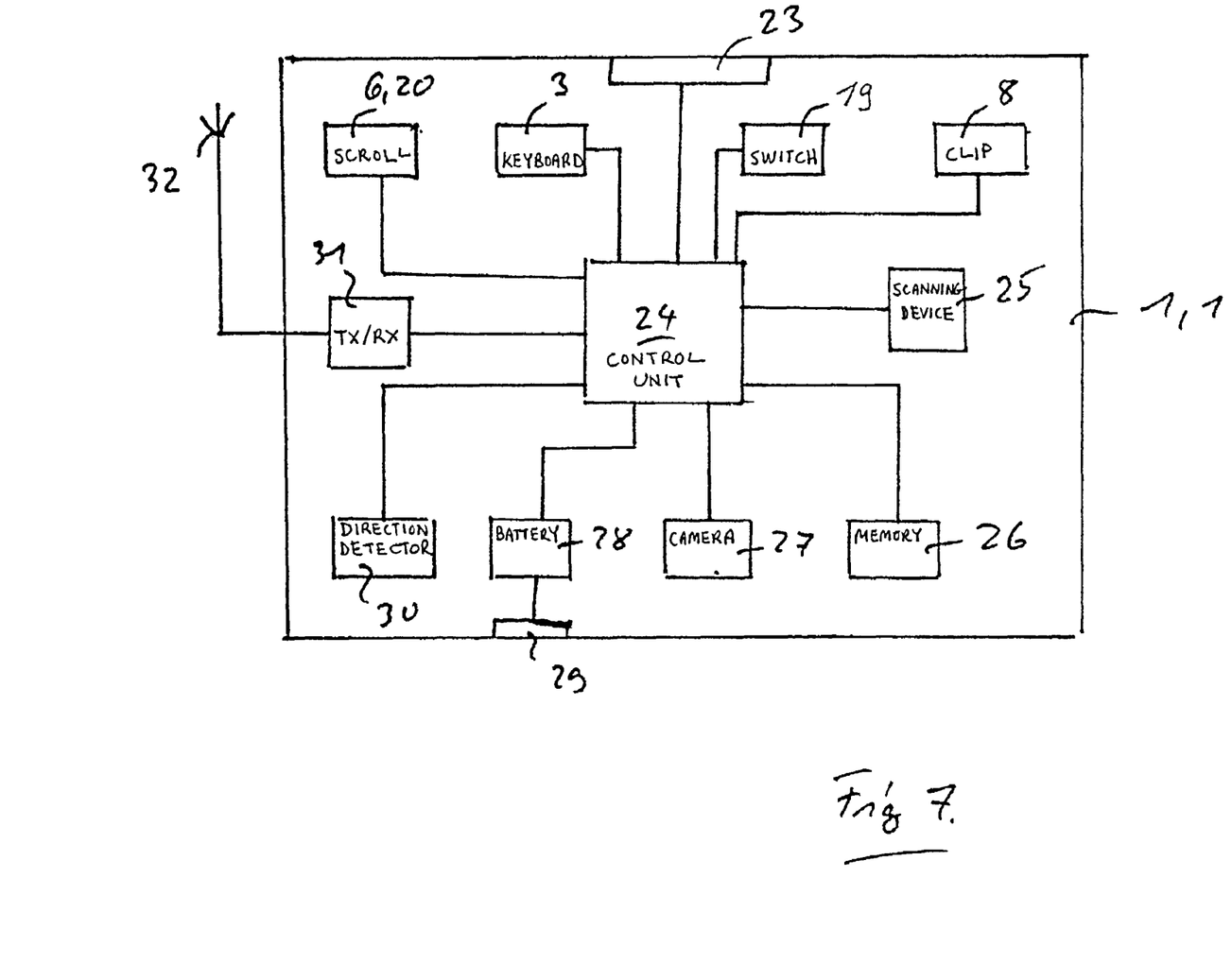
FIG. 7 shows a schematic block diagram of the electronic quipment.

FIG. 7 shows a schematic block diagram of the hand-held electronic equipment 1, 1' of the present invention. The functionalities and elements of the electronic equipment 1, 1' are controlled by a central processing or controlling unit 24. The electronic equipment 1, 1' comprises the above-described scroll device in form of a scroll ring 6 or a scroll strip 20 enabling a user to chose a wanted symbol from the keyboard 3. The wanted and selectable symbol of the keyboard 3 is then actually selected and input to the electronic equipment 1, 1' via the selecting switch 19 which can be part of the second tip 5 in the pen-like embodiment of FIGS. 1 and 2 or part of the clip 8 of the embodiment shown in FIGS. 3 and 4. The electronic equipment 1, 1' further comprises a scanning device 25 which enables the scanning of text and/or symbols. The scanning device 25 can for example be integrated into the side of the electronic equipment 1, 1' as shown in FIGS. 3 and 4 which is opposite to the side on which the clip 8 is located. Further, the electronic equipment 1, 1' may comprise a camera device 27 for taking still or moving pictures. Additionally, the electronic equipment 1, 1' may comprise a memory 26 for storing program or content data. For example, any kind of multimedia data could be stored in the memory 26. The electronic equipment 1, 1' also comprises a battery 28 which is rechargable via an interface 29. Also, the interface 29 can be used to charge a host machine from the battery 28. Additionally, as discussed above, the electronic equipment may comprise an inclination and direction detector 30 which is adapted to detect the movement of the equipment 1, 1' by detecting an angle between a longitudinal axis of the electronic equipment 1, 1' and a horizontal direction, as visualised in FIG. 5, and the direction into which the electronic equipment 1, 1' is pointed in order to control the functionalities as explained in relation to FIG. 5. The inclination and direction detector 30 is adapted to measure the movement of the equipment 1, 1' in a 360° sphere without any dead angle. Here, the essential implementation elements are the use of two 2-dimension inclinometers to construct a 3D angle sensor without any dead angle, i.e. without angles that cannot be measured due to mechanical structure limitations. Further, in a sphere space assuming that the three space dimensions are X, Y and Z, a first inclinometer is used for detecting angles in a plain Y-Z and a second inclinometer is used for detecting angles in a plain Y-X, therefore the three-dimensional information (both direction and gradient) can be detected. Hereby, the chamber of the inclinometer or main body 2 of the electronic equipment 1, 1' may be realised as an electromagnetic damping chamber so that the sensors will not swing too much like a pendulum. It has to be noted that the gravitation force always pulls the sensors down so that the contacts of the sensors should be sliding on a dial or variable resistors to read the angles should be used. Other kinds/formats/structures of an inclinometer can also be used in the electronic equipment 1, 1'. It has to be noted that the position detection can be part of the inclination and direction detector 30 or can be embodied in a separate element. Further, in the example shown in FIG. 7, the electronic equipment 1, 1' may additionally comprise a transmitting/receiving unit 31 which is connected to an antenna 32, via which the electronic equipment 1, 1' is adapted to communicate in a wireless communication system, such as a wireless cellular telecommunication system.

The hand-held electronic equipment 1 can further comprise a pen cap to cover and protect the first tip 4. This pen cap can also be adapted to fit and to be put on the second tip 5 while using the first tip 4 for writing or inputting information via a stylus. The pen cap could be additionally adapted to be used as an adapter to connect the equipment 1 with a 12 Volt socket, e.g. cigarette lighter socket of a car, in order to charge the internal battery of the equipment 1. Additionally, a mini windmill could be provided that could be geared up and connected to the scroll ring 6 or scroll strip 20 of the equipment 1, in order to charge the equipment 1 or a host machine via the equipment 1 when connected to the equipment 1 with a wired connection. The windmill can pick up air movements when the equipment 1 is used outdoors and can transform the mechanical energy resulting from the movement of the windmill into electrical energy which is then used to charge the internal battery of the equipment 1. Hereby, the mini windmill can additionally offer power supply to an external GPS receiver or an internal GPS receiver which is integrated into the equipment 1. Additionally, the equipment 1 may be built in a weather-proof manner, so that wind and/or humidity do not harm the internal functionalities of the equipment 1. Additionally, the equipment 1 may be manufactured in a waterproof manner which resists even hard rain or snow.

Instead of using the above-described preset functionalities and definitions, the hand-held electronic equipment 1, 1' can be adapted to be trained by the user, i.e. some or all of the functionalities can be variably set depending on the likings and the wishes of the user. E.g., the electronic equipment 1, 1' can be set in a way that when the user rotates the pen to an angle of 225° and clicks the right mouse button, the Microsoft Word program on the host machine, e.g. a personal computer, is launched. Everytime the electronic equipment is rotated to this preset angle and the right mouse button is clicked at the same time, Microsoft Word on the personal computer is launched. A further example is that the electronic equipment 1, 1' remembers the actual signature of the user when used in a pen-like manner, e.g. upon first use, the electronic equipment 1, 1' prompts the user to sign his/her name two times and if they match, the signature pattern is remembered and stored in the electronic equipment. In future use, the electronic equipment only starts or performs specific functions if the signature is correctly repeated by a user. Hereby, the electronic equipment 1, 1' may store several signatures so that it can be used by several users. A further example is the use of an active signature for networks, e.g. if a new account is created in a secure link, the user signs with the signature two times. If they match, the signature pattern is uploaded and stored in a server. A valid signature can only be made if the patterns are very much similar. Hereby, e.g. a 100 percent match should be treated as an error or fault. In addition, if a user creates the signature, several time stamps can be tagged on the handwriting paths, therefore the signature is characterised by these time stamps, thus making it impossible to break.

Summarizing the above, the hand-held electronic equipment 1 according to the present invention offers an all in one user interface and input solution for itself and/or for host machines, e.g. digital mobile equipments, in an ultra portable format. It is ultra compact although its functions are not discounted: full layout keyboard, stylus and pen switchable, full joystick functions for games. It is a mouse with right/left buttons, scroll function and forward/backward keys, complicated cursor actions like "drag to select" and "drag and drop" can be easily achieved by the full functional mouse function.

The invention disclosed above shows the principle of a pen-shaped multifunctional digital accessory and its applications. The teachings are just exemplary to demonstrate the idea; the equipment can be subject to many variations and modifications in practice. The mechanical design and use of the hand-held electronic equipment can be applied in various different digital equipments or mobile equipment.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A hand-held electronic equipment comprising
   an oblong main body,
   a keyboard arranged on said main body, said keyboard comprising a plurality of keys with input symbols,
   a scroll device for selecting one of the plurality of keys which is rotatable around and movable back and forth along a longitudinal axis of the hand-held electronic equipment enabling a user to scroll through said keys of said keyboard and to select a key to input a symbol whereby a respectively selectable symbol is highlighted on said keyboard,
   a tip of said body configured as an input device which can be operated in order to input a symbol corresponding to a selected key, and
   an integrated orientation sensor adapted to detect the angular position of the hand-held electronic equipment, wherein depending on the angular position of the hand-held electronic equipment detected by the orientation sensor, the function of the hand-held electronic equipment is changed between a keyboard mode and a mouse/jog dial mode, and
   wherein the hand-held electronic equipment is a data input equipment comprising an interface which is adapted for a wireless or a wired connection to a host machine in order to transmit data input via the keyboard to the host machine;
   wherein the host machine is a remote display, and the interface is adapted for controlling the display of data on the display.

2. The hand-held electronic equipment according to claim 1, comprising a switch for switching between several functions of the hand-held electronic equipment.

3. The hand-held electronic equipment according to claim 1, comprising a tip which is adapted to function as a multi-direction joystick.

4. The hand-held electronic equipment according to claim 1, whereby the hand-held electronic equipment is a radio communication equipment comprising an interface which is adapted for a wireless communication in a wireless radio communication system.

5. The hand-held electronic equipment according to claim 1, whereby the equipment is operative to carry out multiple functions.

6. The hand-held electronic equipment according to claim 1, wherein in the keyboard mode an additional change in the angular position results in a change of the input symbols for the plurality of the keys of the keyboard.

7. The hand-held electronic equipment according to claim 6, whereby there are four defined positions corresponding to respective sets of input symbols for respective functions of the electronic equipment, whereby the positions correspond to an angle between a longitudinal axis of the hand-held electronic equipment and a horizontal direction of 90 degrees, 180 degrees, 270 degrees and 0 degrees, respectively.

8. The hand-held electronic equipment according to claim 7, whereby it is adapted to be configured by a user with respect to the functions corresponding to the respective four defined positions.

9. The hand-held electronic equipment according to claim 6, whereby said orientation sensor is further adapted to detect the direction of the equipment.

10. The hand-held electronic equipment according to claim 1, wherein the keyboard is configured to a mouse mode in which movement of the equipment controls movement of a cursor displayed on the host machine.

11. The hand-held electronic equipment according to claim 1, comprising a user input causing the equipment to switch between an application selection menu and the contents within an application.

12. The hand-held electronic equipment according to claim 1, whereby it is adapted to be configured by a user for at least one of either left or right hand usage, key definition, double click speed adjustment, and strength sensitive cursor moving speed.

13. The hand-held electronic equipment according to claim 1, comprising at least one of a text scanner, a digital camera, and a voice recorder function.

14. The hand-held electronic equipment according to claim 1, wherein the keyboard includes a mini track ball for providing a joystick function.

15. The hand-held electronic equipment according to claim 1, comprising an infrared or LED transceiver for providing a mouse function.

16. The hand-held electronic equipment according to claim 1, whereby the main body has a cylindrical shape.

17. The hand-held electronic equipment according to claim 1, whereby the main body has a pen-like shape.

18. The hand-held electronic equipment according to claim 1, wherein in the mouse/jog dial mode, the hand-held electronic equipment is adapted to control a screen sensor.

19. The hand-held electronic equipment according to claim 1, wherein a detected change of angular position by 90° causes the hand-held electronic equipment to switch between the keyboard mode and the mouse/jog dial mode.

20. The hand-held electronic equipment according to claim 1, wherein the hand-held equipment is in the mouse/jog dial mode when the oblong main body is vertically oriented.

* * * * *